United States Patent [19]

Cerkanowicz et al.

[11] Patent Number: 4,624,765
[45] Date of Patent: Nov. 25, 1986

[54] SEPARATION OF DISPERSED LIQUID PHASE FROM CONTINUOUS FLUID PHASE

[75] Inventors: Anthony E. Cerkanowicz, Livingston; Robert J. L. Chimenti, Short Hills, both of N.J.

[73] Assignee: Exxon Research and Engineering Company, Florham Park, N.J.

[21] Appl. No.: 601,276

[22] Filed: Apr. 17, 1984

[51] Int. Cl.⁴ ............................ B03C 5/02; C02F 1/48; C10G 33/02
[52] U.S. Cl. .................................... 204/188; 55/107; 204/149; 204/186; 204/302; 204/306; 210/243; 210/748
[58] Field of Search ................ 204/186, 188, 302–308, 204/149; 210/748, 243; 55/10, 107

[56] References Cited

U.S. PATENT DOCUMENTS

| | | | |
|---|---|---|---|
| 3,412,002 | 11/1968 | Hubby | 204/180 |
| 3,445,376 | 5/1969 | Stenzel | 204/302 |
| 3,489,669 | 1/1970 | Ruhnke | 204/302 |
| 3,567,619 | 3/1971 | Brown | 204/302 |
| 3,616,460 | 10/1971 | Watson et al. | 204/302 |
| 3,799,855 | 3/1974 | Franse | 204/188 |
| 4,193,774 | 3/1980 | Pilat | 55/10 |
| 4,341,617 | 7/1982 | King | 204/302 |
| 4,454,016 | 6/1984 | Rabinowitz | 204/308 |
| 4,469,582 | 9/1984 | Sublette et al. | 204/302 |

OTHER PUBLICATIONS

G. V. Jorgenson et al., The review of Scientific Instruments, vol. 33, No. 1, pp. 55–56 (Jan. 1962) "Improved Ion Drag Pump".
O. M. Stuetzer, The review of Scientific Instruments, vol. 33, pp. 1171–1177 (Nov. 1962) "Electrohydrodynamic Precipitator".
Pohl & Schwer, Journal of the Electrochemical Society, pp. 383–385 (May 1960) "Particle Separations by Nonuniform Electric Fields in Liquid Dielectrics, Batch Methods".

Primary Examiner—John F. Niebling
Assistant Examiner—William Leader

[57] ABSTRACT

Separation of dispersed liquid contaminant, for example removal of water droplets from oil, is achieved by introducing free charge into the mixture by means of charge injector (1) and discharging the charged mixture through a gas or vapor gap into a separation vessel (2) where the charged mixture comes into contact with a bed of beads (6) (FIG. 1) or other collector surfaces. The introduced charge causes both an electric field to be induced in the separation vessel (2) and the dispersed contaminant to acquire charge, and this results in migration of the charged contaminant. The beads are porous so that they soak up contaminant which can then encourage growth of islands of contaminant on the surface of the beads to a sufficient size that they can be removed from the mixture by gravity separation or other separation techniques. In another embodiment, (FIG. 2) instead of beads, the collector surfaces are provided by a cartridge (23) comprising a porous membrane assembly, the membrane assembly being rolled into a cylindrical configuration with spacer elements (25) between adjacent turns.

28 Claims, 9 Drawing Figures

SEPARATION OF DISPERSED LIQUID PHASE FROM CONTINUOUS FLUID PHASE

CROSS-REFERENCE TO RELATED APPLICATIONS

The specification of this application refers to other application(s) of the present assignees filed on the same day as the present application and bearing the undermentioned assignee case reference(s):

Ser. No. 601,271

BACKGROUND OF THE INVENTION

Frequently, situations arise where it is desired to separate a dispersed liquid phase (contaminant) from a continuous fluid phase, the two phases together forming a mixture. By "dispersed liquid phase" is intended to be conveyed the meaning that the contaminant is discontinuous and immiscible in the continuous phase. The continuous phase is usually a liquid but it could be a gas. An example of a contaminated liquid mixture is fine water droplets dispersed in a lube oil. The separation of the dispersed liquid phase from the phase mixture, particularly where the contaminant droplet are of small size, typically in the range of about 0.1 to about 100 microns in diameter and where the continuous phase is a viscous liquid, typically with a viscosity greater than 10 cp, presents practical problems.

DESCRIPTION OF THE PRIOR ART

Electrostatic separation techniques in various forms are known in which a mixture of a dispersed liquid in a continuous liquid phase is subjected to an applied electrostatic field established between one or more pairs of electrodes. For example in the case of a dispersion of water droplets in a viscous petroleum stream such as a crude oil, various combinations of AC and DC electric fields have been used to promote coalescence of the water droplets due to collisions induced by contact charging and induced dipole interactions to the point where the growth of coalesced water droplets permits their settling by gravity. Improvements have been claimed where combinations of AC and DC electric fields have been employed in a single device and further improvements made by coating the negative DC electrode with a hydrophilic material to enhance coalescence of those droplets which impact the electrode. An example of such an electrostatic separation technique is disclosed in U.S. Pat. No. 4,252,631 (Hovarongkura). The hydrophilic coating provides a continuous surface film.

U.S. Pat. No. 3,567,619 (Brown) describes electrostatic coalescence of small particles of contaminants to form droplets, with the use of a fibrous collecting bed.

In U.S. Pat. No. 4,248,686 (Gidaspow), a separation process is disclosed for solid contaminant in which the contaminant is attracted to a central electrode. The electrode is surrounded by a porous tube whose pores allow clarified carbonaceous liquid to pass through.

A radial flow electrofilter is disclosed in U.S. Pat. No. 4,372,837 (Watson). Finely divided solids, contained in a liquid of low electrical conductivity, are removed by passing the contaminated liquid radially through the filter in the presence of a radially inward, unidirectional electric field. The filter contains a cylindrical bed of dielectric filtering medium which can for example be polyurethane foam or a bed of glass or porcelain beads. A similar electrofilter, but where the contaminant flows through the filter with axial velocity components, is known from U.S. Pat. No. 3,799,855 (Franse).

Similar electrostatic separation techniques are disclosed in U.S. Pat. Nos. 3,415,735 (Brown) and 3,852,178 (Griswold) in which a porous matrix or structure is located between two electrodes and the stream to be clarified is passed through the porous matrix or structure.

Another improved separation technique is disclosed in co-pending U.S. patent application Ser. No. 601,271 in the name of Donald J. Mintz and Anthony M. Gleason, assigned to the present assignee and filed on the same day as the present case, in which an electric field is induced in the mixture and charge imparted to the contaminants to be separated by a charge injection technique using a charge injection device, and the contaminant separates out on the bed surfaces of a bed of densely packed glass beads. It has been found that significantly improved separation efficiency is achieved with this method for small contaminant droplet sizes, typically in the range of 0.1 to about 100 microns in diameter. However, in the case of certain combinations of contaminants and bead material, e.g., water droplets coalescing on glass beads, the growing contaminant droplets can in some instances become detached from the heads before they can grow to a sufficiently large size such that, after re-introduction into the liquid mixture, they can be separated out, e.g., by settling, to form a continuous layer. Therefore, some of the forming droplets on the surfaces of the beads may be re-introduced in emulsion form, and water separation on an appreciable scale may not be achievable.

SUMMARY OF THE INVENTION

This invention concerns apparatus that is suitable for use in the electric separation of a dispersed liquid phase from a continuous liquid phase, the two phases forming a phase mixture, and in which, in operation, the dispersed phase is caused to migrate, usually but not necessarily within the phase mixture. According to the invention, the apparatus comprises collector means disposed in a dispersed phase separation and collection region, so as to be in contact with the phase mixture in the path of the migrating dispersed phase. The collector means comprises porous material having a surface region which is exposed to the migrating dispersed liquid phase, the porous material promoting liquid phase growth at separate sites on the aforesaid surface region of the collector means.

"Porous material" and "porosity" are used to convey the idea of a material and property of a material, respectively, having a random network of channels or the like traversing the bulk of the material and some channels intersecting the surface. The porous material soaks up the contaminant liquid phase in its pores and promotes growth of the contaminant liquid phase at separated sites on the exposed surface region of the collector means.

It is immaterial how the migration of the dispersed phase is brought about, so long as it occurs. Various forms of electric separation apparatus that are suitable for this are readily apparent to the man skilled in the art and therefore need not be described herein. However, it is particularly preferred that, for the purpose of producing the required migration of the dispersion, the electric separation apparatus comprise means, arranged to introduce free charge into the phase mixture to cause an electric field to be induced in the mixture and the dispersed phase to be charged. Free charge is positive or negative ions which, initially, are free to move through the continuous background phase. The induced electric field and charged contaminants interact and this causes migration of the charged dispersed liquid contaminant droplets within the phase mixture. The free charge introducing means may take the form of a charge injector such as disclosed in U.S. Pat. No. 4,255,777 (Kelly) which discloses charge injection predominantly or solely by field emission.

In a preferred embodiment for the clarification of a contaminated liquid, the collector means is in the form of porous beads. The beads will normally be arranged as a closely packed bed on a supporting gauze or the like within an upright separation vessel. Such an arrangement provides generally short migration paths for the contaminant droplets, resulting in effective contaminant separation efficiency. Clearly, the smaller the bead size, the more closely packed they will be and the shorter the migration paths for the contaminant droplets. A charge injector is positioned above the vessel and issues charged contaminated liquid into the vessel through a gas or vapor space before entering the separation vessel. The gas or vapor space is provided to enable the charged fluid to exit the charge injector with high velocity to efficiently sweep out the injected charge and also to eliminate any charge dissipation path back to the charge injector. Such decoupling of the separation vessel from the charge injector is important for achieving a high level and high efficiency of charge injection. It is of no particular importance to the effective removal of contaminant whether the contaminated liquid is sprayed by the charge injector or simply issues as a continuous stream into the separation vessel, particularly at relatively high velocity throughputs in the charge injector. However, when the contaminated liquid is sprayed, the individual liquid droplets are in general separated from one another and this can be important where lower throughput velocities, closer to the drift velocity of the individual charges, are employed. It is, however, remarked that it is necessary that there be no contact between the spray and stream passing through the gas or vapor space and the surrounding separation vessel walls, in order to avoid charge dissipation. Where the continuous background phase is a gas, this can be achieved by introducing a secondary gas flow which provides an inner annular protective sheath on the surrounding wall surfaces. Suitably, the gas or vapor space can be provided by the ambient atmosphere separating the charge injector from the separation vessel, or it can be enclosed and a purge gas, e.g., nitrogen, circulated through the space to avoid any risk of explosion or chemical reaction. In addition, the purge gas helps to obtain uniform separation results irrespective of changes in ambient conditions, especially humidity, which can affect the rate of depletion of charge where an air space is present. In the absence of any such gas, reduced separation efficiencies will result. According to a development, the gas or vapor space is pressurized, which can maintain a satisfactory throughput rate in the separation vessel even for rather viscous liquids and can increase the throughput rate for less viscous liquids.

It is further remarked that although a relatively high velocity of throughput is required in the charge injector, the liquid in the separation vessel needs to remain there long enough to enable contaminant migration to the bead surfaces. This generally requires a much lower velocity throughput in the separation vessel than in the charge injector. Typical values for these throughput velocities in the charge injector and separation vessel are 1 m/sec and 1 cm/sec, respectively. In another embodiment, the internal cross-sectional diameters of the charge injector outlet orifice and the separation vessel are 0.025 cm and 10 cm, respectively. These figures are purely exemplary and have no limiting character.

The vessel also has means, for example flow control valves in outlets from the vessel for the clarified liquid and for the separated contaminant, respectively, operable for the selective discharge of the contaminant liquid that has separated out under gravity and the clarified liquid phase. The charged body of liquid in the vessel should just cover the beads, in order that all the beads can act as collector surfaces for the liquid contaminant. This can be achieved by manually opening the flow control valves periodically or controlling them automatically from a controller operated by a level detector in the separation vessel.

It is stressed that the electric field is the result not of voltage applied to any electrodes, but rather arises from the total introduced or injected charge distribution in the liquid and on the contaminants and separation vessel wall surface regions and collector means where separation occurs.

It will be appreciated that the viscosity and conductivity of the background liquid phase need to be relatively low such that the contaminant can reach the collector surfaces before any appreciable leakage or depletion of its charge can take place such as would diminish to an ineffective level the electrical migration force acting on the contaminants. Typically, the product of the viscosity and conductivity of the continuous background liquid phase would be less than $10^{-7}$ centipoise/ohm-meter, but this is not to be regarded as limiting in any way.

At least in the case of clarification of water-contaminated oil, ideally the absorptivity of the porous material will be in the range of about 0.1% to about 40%, preferably in the range of 1-10%, even more preferably 2-10%.

Alternatively or in addition, the surface region of the collector means may be characterized by exhibiting surface pore sites which are clustered, the surface sites being separated by contaminant-repelling sites. When treating a water-in-oil emulsion, for example, the contaminant repelling sites would be hydrophobic.

Porous materials which have been found to give good separation results for water-contaminated oil are polystyrene, polycarbonate, cellulose acetate, and silica gel.

In another suitable embodiment, the collector means comprises essentially a porous membrane having one surface exposed to the migrating dispersed liquid phase and the other surface communicating with a closed reservoir for said liquid phase. In a preferred way of realising this collector means, an assembly of a pair of spaced-apart porous membranes in face-to-face array defining a closed reservoir between them is used, the porous membrane assembly being arranged with both of its outer membrane surfaces exposed to the charged phase mixture. Suitably, when separating a dispersed liquid phase from a continuous liquid phase, the membrane structure comprises a porous membrane assembly of two rectangular membranes, the assembly being rolled into a cylindrical configuration with spacer elements between adjacent turns to provide axial flow passages for the charged phase mixture, the cylindrical membrane structure being positioned coaxially within an upright cylindrical separation vessel, the vessel having an electrostatic charge injector above the cylindrical membrane structure for injecting charge into the phase mixture to be treated and issuing the charged mixture downwardly into the interior of the vessel, the vessel also having means operable for the selective discharge of dispersed phase that has separated out under gravity, and of clarified continuous liquid phase. As in the first embodiment, the body of liquid in the separation vessel should just cover cylindrical membrane structure. The porous membranes may comprise cellulose acetate sheets.

The invention also comprises a method for use in the separation of a dispersed liquid phase from a continuous fluid phase together forming a phase mixture. The method comprises essentially two steps which are:

(a) introducing free charge into the phase mixture to cause an electric field to be induced in the mixture and the dispersed phase to be charged such that the interaction between the induced electric field and the charged dispersed phase causes migration of charged dispersed liquid within the phase mixture; and (b) bringing the charged phase mixture into contact with a collector means for dispersed liquid phase comprising porous material having a surface region exposed to the migrating dispersed liquid phase, said porous material promoting growth of liquid phase at the sites of the pores on said surface region.

It will be appreciated that the invention is not limited to separating a single contaminant from the mixture. Two or more contaminants may be separated, providing each of them forms, or the two contaminant phases are combined to form, a dispersed phase within the background fluid phase.

It is to be noted that the collector surfaces need not necessarily be stationary. For example, the stream of charged liquid issuing from the charge injector could be seeded with collector beads before the stream enters the separation vessel and the beads removed from the liquid again at a downstream location, in the separation vessel itself, for example. Alternatively, the bed of beads can be fluidized. One way in which this can be achieved is using a concentric cylinder arrangement for the separation vessel with the beads at least partially filling the annular gap between the two cylinders and pressurizing the gas space above the separation vessel to drive the charged liquid inside the inner cylinder into the annular space from below.

The invention has the advantage that it can provide an apparatus and a method capable of effectively separating a dispersed liquid contaminant phase from a continuous fluid background phase, even for contaminant droplets of small size such as of the order of 0.1 to 100 microns in diameter. It can also provide a contaminant separation apparatus that is simple in construction. Furthermore, the invention can provide an apparatus and a method for the effective separation of water droplets from a hydrocarbon background liquid.

BRIEF DESCRIPTION OF THE DRAWINGS

The way in which the invention may be put into effect and other features and advantages will become apparent from the following description, given by way of example, with reference to the accompanying drawings, in which:

FIG. 2a is a perspective view of the membrane collector structure;

FIG. 2b is a perspective view of a detail of FIG. 2a;

DETAILED DESCRIPTION OF THE PREFERRED EMBODIMENTS

For the purpose of illustration, the following description refers to liquid contaminants having a higher density than the continuous fluid phase, such as water droplets in a lube oil, but this is not to be regarded as limiting the invention in this respect.

The contaminant separation technique to be described involves three different stages, namely unipolar charging of the contaminants, accumulation and growth of the contaminants on specially-selected porous collector surfaces across or through which the charged, contaminant-laden liquid flows, and the re-entrainment of the coalesced, larger diameter, contaminants into the fluid followed by settling or flotation.

Figure 1:
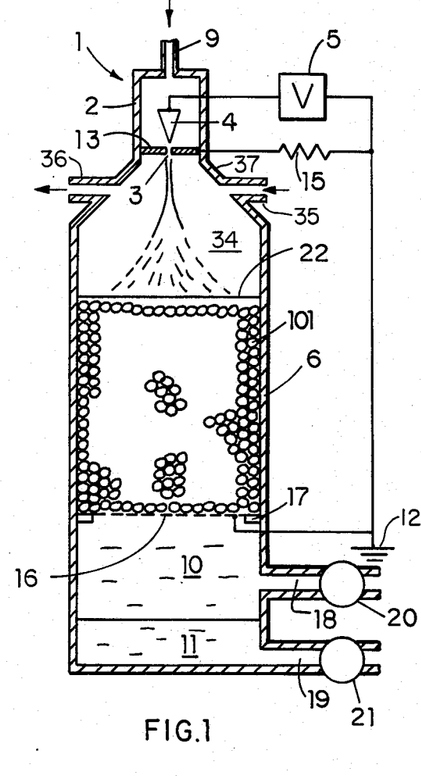
FIG. 1 is a diagrammatic, vertical sectional view of one form of contaminant separation apparatus employing separation beads.
Figure 1A:
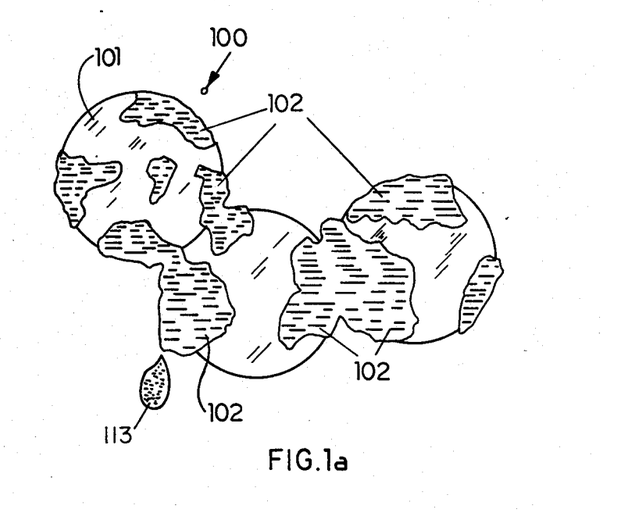
FIG. 1a is an enlarged partial view of a group of beads, showing how migrating droplets coalesce and agglomerate on the surface of the beads and are then re-entrained into the liquid mixture.

Separation apparatus that is effective to carry out these steps is shown in FIG. 1. In this Figure, the viscous contaminated liquid mixture to be treated is introduced into the inlet 9 of an electrostatic charge injection device 1 positioned above an upright cylindrical separation vessel or reservoir 6. The charge injector 1 injects free charge which is net unipolar (net positive or net negative) into the mixture. Suitably, the charge injection device is constructed in accordance with the teaching of U.S. Pat. No. 4,255,777 assigned to the present assignees, the contents of which are expressly incorporated herein by reference for a complete understanding of the construction and operation of the charge injector. However, in substance, such a charge injector, as shown, essentially comprises an upright, suitably cylindrical, chamber 2 through which the mixture passes, having a bottom wall 13 which is an electrode with an orifice 3 in it and a sharply pointed electrode 4 connected to a high voltage power supply 5 and arranged with its point closely adjacent to and in line with the opening 3. Electrode 13 is maintained at a lower voltage, relative to earth 12, than pointed electrode 4, and may, as shown, be connected to earth 12 through a resistance element 15. Charge is injected, by means of the electrode pair 4, 13, into the mixture issuing through the orifice 3 and is discharged downwardly through a gas or vapor space 34 into a separation vessel 6 below the charge injector 1. The charge injector body, as shown, is supported on an insulated frusto-conical cap 37 on top of the separation vessel 6 which encloses the gas space 34. The enclosed space 34 can be in open communication with the ambient atmosphere through a single pipe 35 or a purge gas can be circulated through the enclosed space via inlet and outlet pipes 35, 36 in the cap 37, for avoiding any risk of explosion or chemical reaction, which might otherwise present a problem in the case of certain contaminated liquids. In a development, the gas space 34 can be pressurized from an external air source (not shown) to increase the throughput rate in the separation vessel. The stream issuing downwardly through opening 3 may break up into a spray at a short distance below the orifice, due to the injected charge, but the existence of a spray as opposed to a charged stream, or the location of onset of spray, are not generally critical to the effective operation of the contaminant separation apparatus, particularly at relatively high velocity throughputs in the charge injector. However, when the contaminated liquid is sprayed, the individual liquid droplets are in general separated from one another and this can be important where lower throughput velocities, closer to the drift velocity of the individual charges, are employed.

A grounded gauze 16 resting on an internal circumferential shoulder 17 on the inner wall surface of the vessel 6 but electrically insulated from vessel 6, serves as the third electrode of the charge injector 1 to complete its electrical circuit. The gauze 16 supports a bed of beads 101 of specially selected porous material, as will be explained hereinbelow, in a central region within the vessel 6. The material of which vessel 6 is made should be chosen so as not to provide a conduction path between electrode 13 and ground. Conveniently, vessel 6 is made from plastics material. Below the gauze where the oil and water separate into an oil phase 10 and a water phase 11, as will be explained, respective oil and water outlets 18, 19 with release valves 20, 21 are provided. The operation of the separation apparatus will now be described.

The first step in the separation technique is the production of excess charge of one sign (unipolar) in the otherwise electrically-neutral contaminant laden stream using the charge injector. It is to be understood that the invention is not limited to charge injection (field emission) as described above, but other techniques are possible instead, such as electron beam and high energy particle radiation, or photoemission. Electron beam, photoemission and field emission are all examples of electron emission. Alternatively, volumetric charge introduction techniques in the bulk of the fluid mixture can be used, such as photo-ionization and secondary ionization, or thermalization of high energy particle radiation. These examples all involve ionic dissociation within the phase mixture.

Following the free charge introduction, the excess charge transfers to the contaminants in the liquid mixture. It is assumed that the excess charge density exceeds the liquid background charge density (i.e. the density of bipolar charge carriers which are intrinsic to the liquid and which result in the conductivity of the liquid); then, space charge fields caused by the excess charge density will act on the individual charge carriers and drive them to the boundaries of the liquid mixture. Some of the charge will be intercepted by the individual contaminants of the contaminant dispersion and the contaminants will thereby become charged. The charged contaminants will experience an electrical force which will cause the contaminants to move towards the outer fluid mixture boundaries. It is to be noted that the electrical conductivity of the continuous background phase should be sufficiently low, e.g., $10^{-8}$/ohm-meter otherwise it might conduct away the charge on the contaminant droplets before they reach any collector surface.

The second step in the process involves the coalescence of the migrating droplets on surfaces of the specially selected porous material. As already described, the material may be in the form of a packed bed of beads or a supported membrane, for example. The charged dispersed contaminants will stream through the fluid boundary layers to the surface of the porous material driven by the space-charge field.

The material of which the beads are made is chosen such that the impinging charged contaminants will adhere selectively to specific surface sites. The contaminant phase continues to accumulate and grow at these sites until gravity, buoyancy or fluid flow causes the contaminant phase to re-enter the liquid, but now as considerably larger droplets. Thus, referring to FIG. 1*a*, there is shown a micron or sub-micron sized contaminant droplet 100 approaching the surface of one of the closely packed beads 101 in the separation vessel 6, on which beads several islands 102 of contaminants are growing. Agglomeration and coalescence continues for each island of water until, as shown for one 102 of the islands, a part of it is re-entrained back into or re-enters the liquid mixture, but it now has the form of a much larger droplet 113 than the original migrating droplet 100.

The third step involved the settling (or flotation, depending upon the density of the contaminant phase relative to that of the background liquid phase) of the re-entrained liquid contaminants to form a distinct continuous background phase (oil phase) 10 which may be easily separated off via oil outlet 18. The contaminant continuous phase (water) can be removed through outlet 19.

As already indicated, the charged body of liquid in the separation vessel ideally should just cover the beads 101, as indicated by level 22, in order that all the beads can be utilised in the separation process. The level 22 can be maintained, normally by operating valves 20, 21 periodically, or automatically using a controller to operate the valves, itself responsive to a level detector (not shown) in the separation vessel 6.

The material upon which the surface coalescence occurs must satisfy several criteria. The surface density of sites upon which the contaminant water droplets can adhere must be sufficiently high to permit the accumulation and growth of the contaminants to a size where they will settle when returned to the liquid mixture.

In the case that the contaminants are conductive, such as water, the material should exhibit surface sites which are clustered, separated by inactive contaminant-repelling sites, so that the contaminants accumulate as discontinuous patches or islands 102 as shown in FIG. 1*a*. This will prevent the electric space-charge fields, which drive the contaminants to the surface and provide the charge enhancement, from being shorted out by the conductive paths provided by the growing areas of coalescing contaminant.

Additionally, the material needs to provide steady-state maintenance of the discontinuous islands, films or contaminants. In the case of water contaminants in oil, for example, pre-wetting a non-porous collector surface is generally not viable since the predominant oil phase will eventually displace the initially prepared water film and eliminates the continuous accessability of hydrophilic islands necessary for the surface coalescence process to proceed on a continuous basis.

Figure 1B:
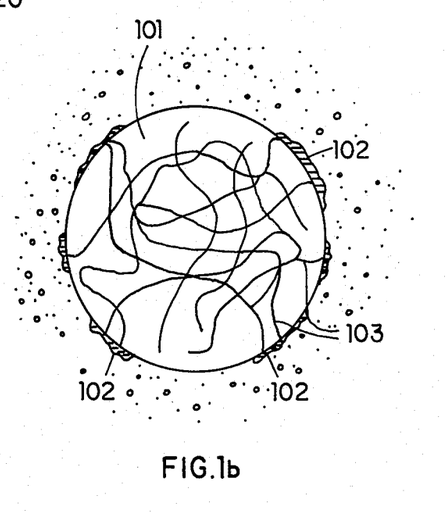
FIG. 1b is an enlarged vertical section through a single porous bead.

In order to maintain such active islands of water, these surface sites need to be permanently wetted. It has been found that this result can be achieved when the material on which contaminant agglomeration and coalescence occurs is porous. FIG. 1b illustrates how the sites where the pores (103) meet the outer surface of each bead 101 promote or support growth of islands 102 of water. The pores inside of the bead become saturated with water and thereby act as reservoirs to maintain the surface sites wetted.

Materials which have been found to satisfy these criteria are those which have absorption capacities for water ranging from about 0.1 to about 10%. These materials would be expected to exhibit both hydrophilic surface sites as well as a somewhat porous structure which enables transfer of water from the bulk of the material to the active surface sites. Thus, the porous region within the beads acts as a kind of reservoir which keeps the surface pore sites wetted to promote growth of islands of water. Materials with absorption capacity up to about 10% are not expected to provide continuous conductive paths along the surface or through the bulk of the material such as would reduce the effectiveness of the water separation technique. Materials with higher absorptivities of up to about 40% can be expected to give satisfactory performance.

Figure 2:
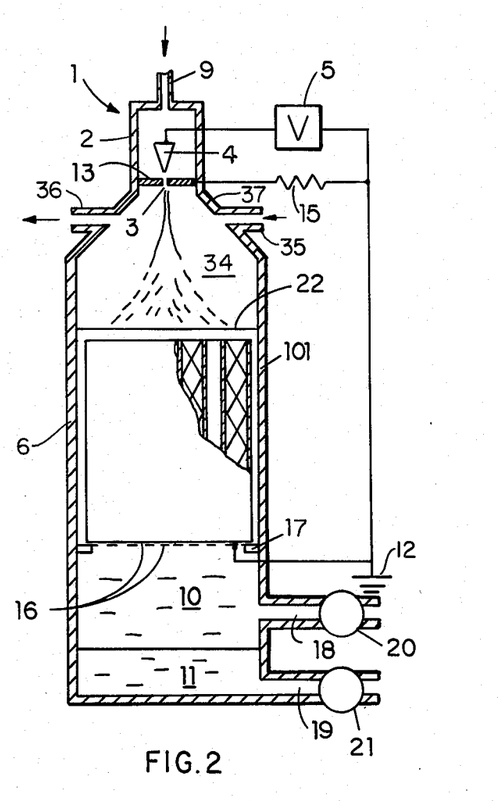
FIG. 2 is a view similar to FIG. 1 but showing a porous-membrane collector structure used in place of the beads.
Figures 2A, 2B:
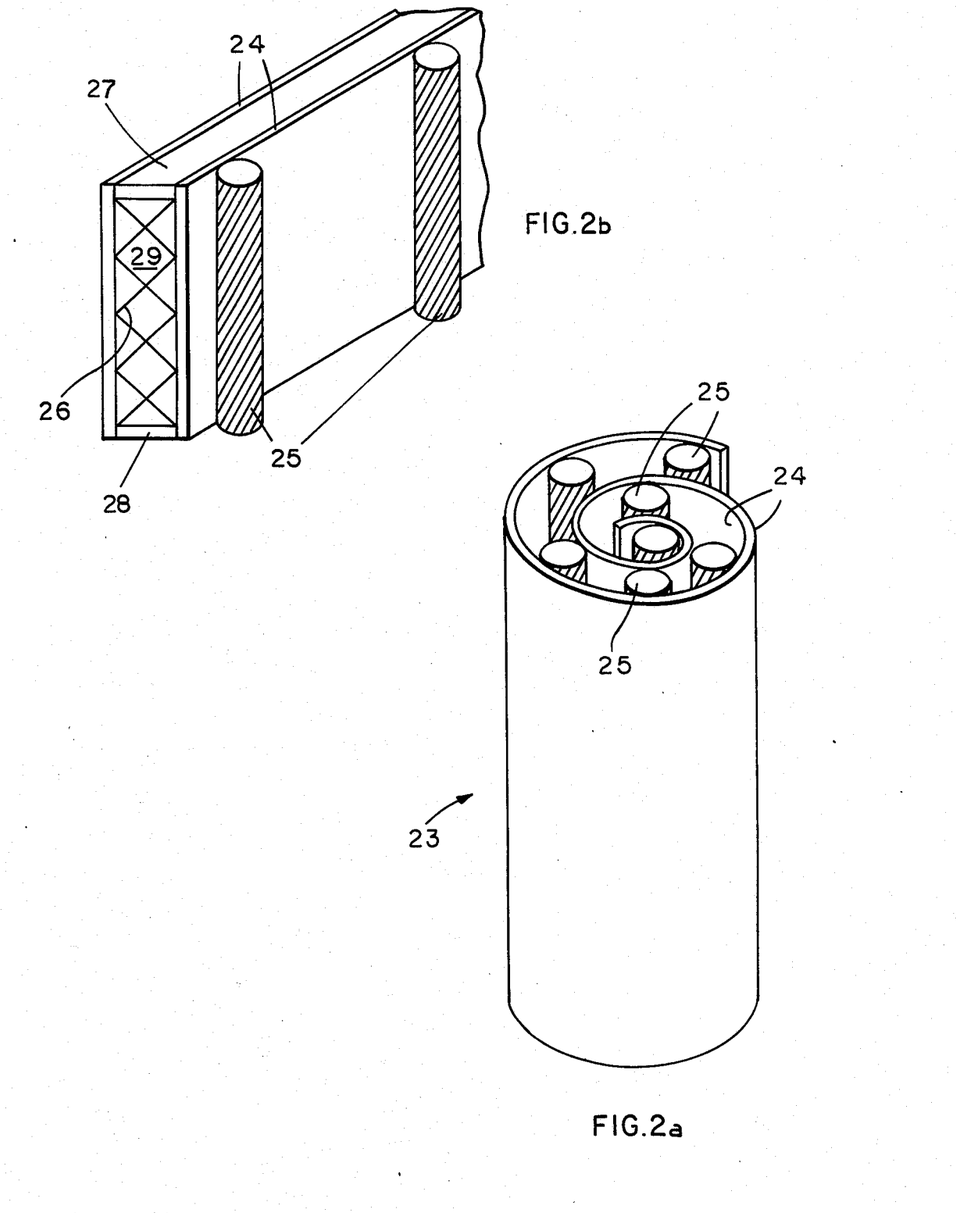

Reference is now directed to the second embodiment illustrated in FIGS. 2 and 2a-2c. In FIG. 2, the same reference numerals as used in FIG. 1 denote the same or corresponding parts. The difference resides in the use of a porous membrane structure 23 in place of the densely packed beads. This membrane structure is cylindrical in configuration and located within vessel 6 resting on gauze 16 so as to be located coaxially with the cylindrical vessel. The membrane structure 23 as shown in FIG. 2a comprises a porous membrane assembly of two initially flat, rectangular membranes 24, spaced apart from one another and in face-to-face array, which is rolled up, with successively overlapping turns mutually separated by means of rigid spacer elements 25, to form the cylindrical membrane structure shown in FIG. 2a. FIG. 2b shows a detail of the membrane assembly with the cylindrically curved membranes 24 flattened out for clarity. The rectangular membranes 24, suitably consisting of cellulose acetate sheet, are held spaced-apart by a spacer and support arrangement, very diagrammatically shown at 26, which can be a fibre-glass screen. The top and bottom edge pairs of the two membranes 24 are sealed off as shown diagrammatically at 27, 28, respectively, by adhesive or heat fusion. In this way a closed reservoir 29 is defined between the membranes 24 containing the same liquid as that forming the dispersed phase. The spacers 25 are suitably made of plastics material.

Figure 2C:
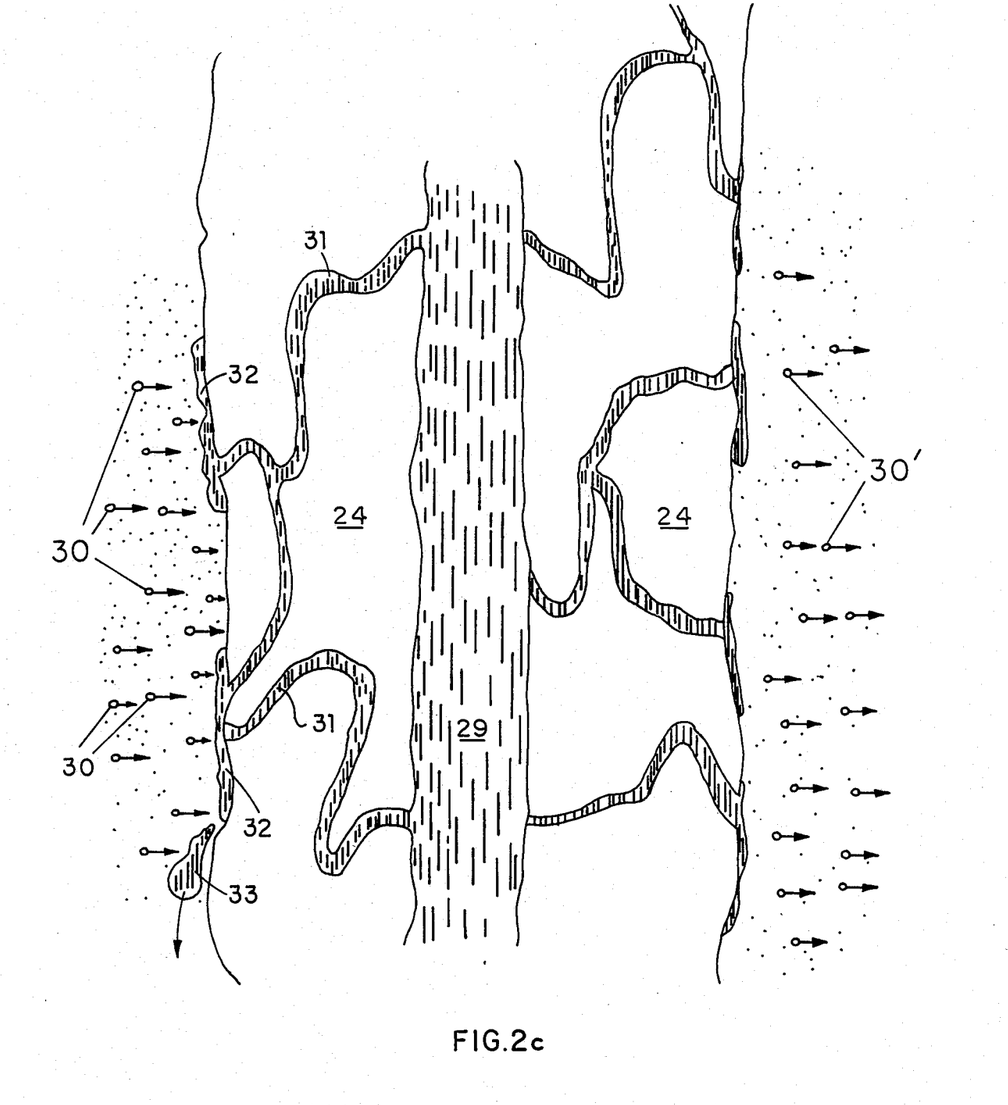
FIG. 2c is an enlarged vertical section through a portion of the porous membrane on an exposed surface of which fine water droplets are agglomerating and coalescing.

FIG. 2c, which is an enlarged view showing a vertical section through the membrane assembly of FIG. 2b with the thickness of each membrane 24 enlarged for clarity of illustration, shows outer membrane surfaces exposed to the bulk liquid mixture, containing droplets 30 of contaminant migrating, generally in the radial direction, and encountering the exposed surface of one membrane 24. The channels provided in the membrane due to its porosity are indicated at 31. It can be seen that at the surface sites where the channels 31 intersect the exposed membrane surface, islands 32 of contaminant form and grow until considerably larger drops 33 of contaminant break away and separate-out (or float) to form a discrete layer of contaminant. The suspended droplets 30', beyond the exposed surface of the other membrane 24 will in fact in the main migrate in the same direction as droplets 30, i.e., away from that other membrane 24, but they will encounter the inner exposed membrane surface of the next turn of the membrane assembly.

In a simpler arrangement (not shown, but whose construction is readily apparent from FIGS. 2 and 2a to 2c), a single rectangular membrane 24 is progressively wound up into a spiral configuration with periodic insertion of spacers 25 between successive turns of the spiral membrane assembly as the spiral winding proceeds. In this embodiment, the interior reservoir 29 within membrane structure 23 is absent. In operation, the pores of the membrane become wetted with the contaminant liquid which promotes growth of islands of contaminant at the surface sites of the membrane pores.

In some instances, it is conceivable that with contaminant droplets of high conductivity, arcing might occur in the charge injector. Another possibility is that contaminant deposits may tend to build up in the charge injector leading to reduced charge injection efficiency and/or blockages. These problems can be overcome in a modified arrangement (not illustrated) in which the contaminated fluid is introduced directly into the separation vessel and the charge injector is used instead to inject charge into a substantially contaminant-free stream of preferably the same or alternatively a different fluid and issue the charged stream into the separation vessel in which the contaminated and charged fluids mix and charge transfers to the contaminant dispersion, to bring about contaminant migration and conglomeration as described above. Reference is expressly directed to co-pending U.S. patent application Ser. No. 601,274, assigned to the present assignee and filed on the same day as the present application, for a more complete understanding of the above briefly described technique for charging the contaminant-laden fluid.

EXAMPLES

Figure 3:
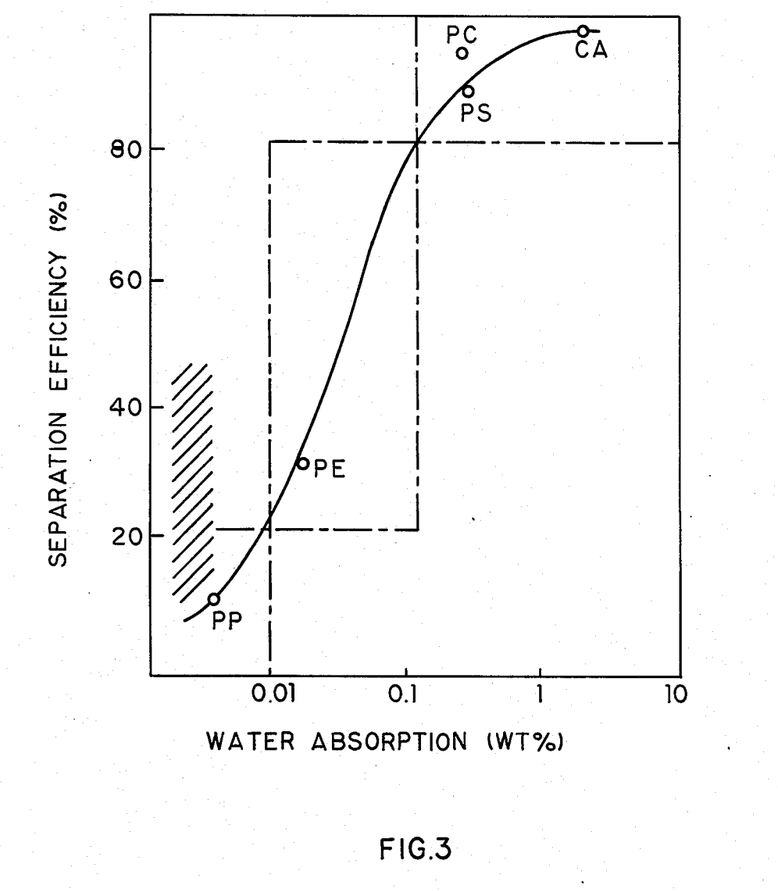
FIG. 3 is a graph showing the variation of relative separation efficiency for materials of different absorptivity.

Tests of the concept for a materials selection were carried our for a water dispersion in the concentration range of 0.1 to 1.0% in a dewaxed lube oil with a viscosity of approximately 255 cp, to be designated as S600N oil. FIG. 3 shows the result of the separation efficiency measured for a variety of materials with different capacity for water absorption, PP, PE, PC, PS and CA representing, respectively, the separation efficiencies of polypropylene, polyethylene, polycarbonate, polystyrene and cellulose acetate. The shaded region represents the spread of data obtained for various glass samples. Porous glass, commonly called silica gel, however, performs as well as cellulose acetate. Results confirm that a high separation efficiency is obtained for materials with an absorption capacity of between about 0.1 and about 10% and considerably poorer separation efficiency below this range. Better results overall were observed within the range 1 to 10%, more preferably 2 to 10%. Therefore, polycarbonate, polystyrene and cellulose acetate are suitable materials for the collector material whereas non-porous glass, polypropylene and polyethylene, which all gave a separation efficiency of below 50%, are outside the scope of this invention.

Figure 4:
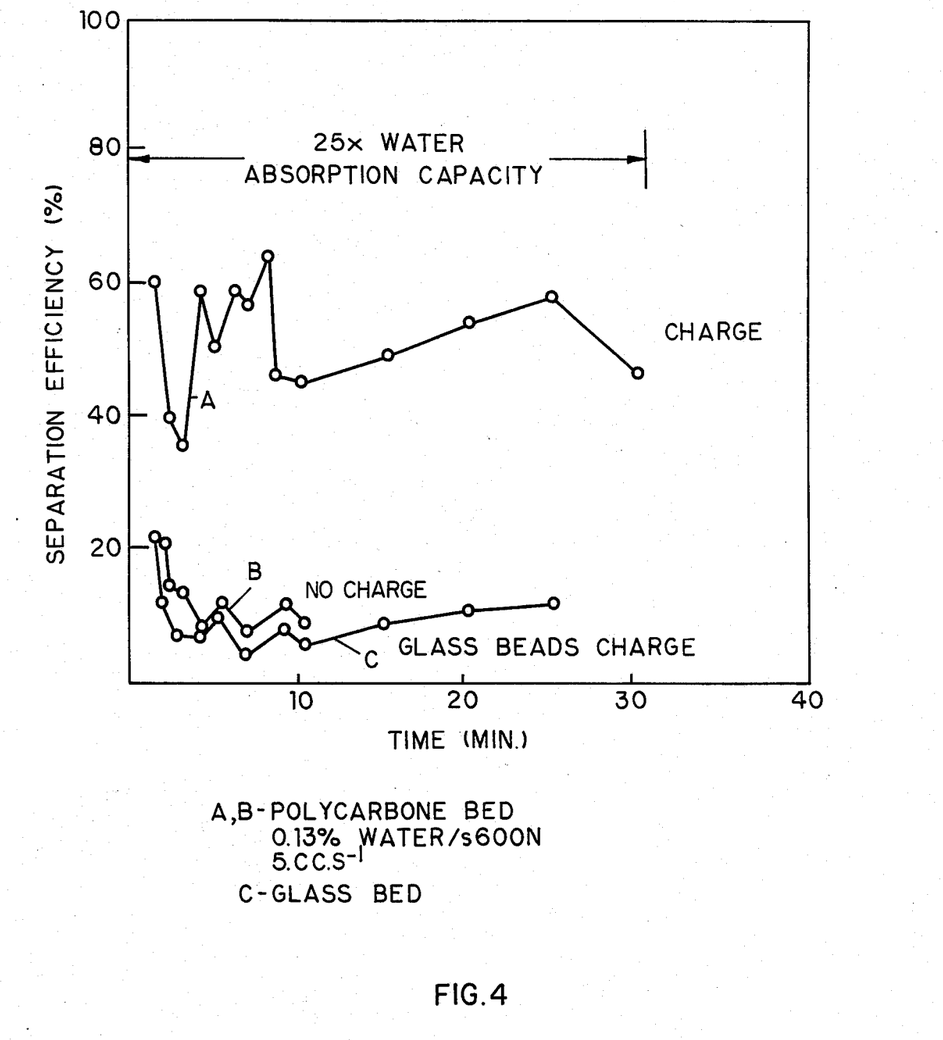
FIG. 4 indicates how separation efficiency varies with time.

To demonstrate the concept and emphasize that the process is, in steady state, a surface coalescence process rather than bulk absorption into the porous material, tests were run with a 0.15% dispersion of water in the aforementioned S600N oil through a bed of polycarbonate beads at a flow rate of 5 cm$^3 \cdot$s$^{-1}$. The results are shown in FIG. 4. The curves A and B were obtained when charge is and is not injected, respectively, into the water-laden stream. The enhancement in the separation efficiency by a factor of five due to the unipolar charging of the fluid can be seen. In addition, the enhancement due to the selection of appropriate materials can be seen from curves A and C. Curve C is the result of using glass beads. Finally, the results shown in FIG. 4 also confirm that surface coalescence is a continuous process rather than a transient bulk absorption by the polycarbonate. This can be seen from the fact that during the 30 min. run a relatively steady-state constant separation efficiency was maintained even though 25 times the amount of water needed to saturate the absorption capacity of the polycarbonate beads was passed through the bed.

It is to be noted that the porous beads did not have to be specially wetted before use. It was found that the moisture existing naturally within the pores in ordinary room conditions was adequate to promote the growth and coalescence of the contaminant phase.

What is claimed is:

1. A method for use in the separation of a dispersed liquid phase from a continuous liquid phase, the two phases together forming a phase mixture, by producing migration of dispersed phase droplets within the phase mixture, said method comprising the steps of:
   (1) introducing free charge that is net unipolar into said phase mixture, at least predominantly by electron emission which causes the continuous phase to act as a medium through which volumetric distribution of the introduced charge takes place, there being a sufficient excess of free charge introduced such that the volumetric charge distribution causes in a region containing a quantity of the charged phase mixture, both an electric field to be induced in the mixture and the dispersed phase to become charged, and the induced electric field and the charge on the dispersed phase interact to produce an electrical driving force acting on the dispersed phase so that said migration is due substantially to said driving force, and
   (2) allowing the migrating dispersed phase to accumulate, within said phase mixture in said region, adjacent to collector means for dispersed phase comprising at least one collector element of porous material having a surface region exposed to the migrating dispersed phase droplets, said porous material having sufficient porosity as to absorb dispersed liquid phase into its pores and thereby trap dispersed phase at separate sites on said surface region for promoting droplet coalescence and growth with further droplets undergoing electrically-driven migration to those sites.

2. A method as claimed in claim 1, wherein the absorbtivity of the porous material is in the range of about 0.1 to about 40%.

3. A method as claimed in claim 1, wherein the absorptivity of the porous material is in the range of about 1 to about 10%.

4. A method as claimed in claim 1, wherein the absorptivity of the porous material is in the range of about 2 to about 10%.

5. A method as claimed in claim 1, wherein said surface region is characterized by exhibiting surface pore sites which are clustered, said surface sites being separated by dispersed phase repelling sites.

6. A method as claimed in claim 1, wherein the collector means is in the form of porous beads of low electrical conductivity.

7. A method as claimed in claim 1, wherein said porous material is polystyrene.

8. A method as claimed in claim 1, wherein said porous material is polycarbonate.

9. A method as claimed in claim 1, wherein said porous material is cellulose acetate.

10. A method as claimed in claim 1, wherein said porous material is silica gel.

11. A method as claimed in claim 1, wherein the free charge is introduced into a stream of said mixture, at least predominantly by field emission, and the charged stream is passed through a gas or vapor space, before entering a vessel containing said quantity of charged phase mixture, for minimizing charge dissipation from the charged phase mixture in said vessel back to where the free charge introduction took place.

12. A method as claimed in claim 1, wherein the free charge is introduced without producing ionic dissociation within the phase mixture.

13. A method for use in the separation of a dispersed liquid phase from a continuous liquid phase, the phases together forming a phase mixture, by producing migration of dispersed phase droplets within the continuous liquid phase mixture, said method comprising the steps of:
   (1) introducing free charge that is net unipolar into the phase mixture in such manner as to cause the continuous phase to act as a medium through which volumetric distribution of the introduced charge takes place;
   (2) passing the charged phase mixture into a separation vessel, the charged phase mixture, before entering said vessel, being directed as a stream through a gas or vapor space for minimizing charge dissipation from the charged phase mixture in said vessel back to where the free charge introduction took place, there being a sufficient excess of free charge introduced such that the volumetric charge distribution causes, in said vessel, an electric field to be induced in the phase mixture and the dispersed phase to become charged, and the induced electric field and the charge on the dispersed phase interact to produce an electrical driving force acting on the dispersed phase so that said migration is due substantially to said driving force, and
   (3) allowing the migrating dispersed phase in said vessel to accumulate, within said phase mixture, adjacent to collector means for dispersed phase comprising at least one collector element of porous material having a surface region exposed to the migrating dispersed phase droplets, said porous material having sufficient porosity as to absorb dispersed liquid phase into its pores and thereby trap dispersed phase at separate sites on said surface region for promoting droplet coalescence and growth with further droplets undergoing electrically-driven migration to those sites.

14. A method as claimed in claim 13, wherein the gas or vapor space is enclosed and a purge gas is flowed through said gas space.

15. A method as claimed in claim 13, wherein the free charge is introduced predominantly by electron emission.

16. A method as claimed in claim 13, wherein the free charge is introduced without producing ionic dissociation within the phase mixture.

17. A method as claimed in claim 13, wherein the absorptivity of the porous material is in the range of about 0.1 to about 40%.

18. A method of separating a dispersed liquid phase from a continuous liquid phase, the phases together forming a liquid phase mixture, by producing migration of dispersed phase within the phase mixture, said method comprising the steps of:
   (1) flowing a stream of the phase mixture past a pointed high potential electrode at sufficient velocity that free charge that is net unipolar is injected by field emission into the liquid mixture and is conveyed by the flowing stream away from the high potential electrode, the free charge being injected into the phase mixture stream in such manner as to cause the liquid to act as a medium through which volumetric distribution of the injected charge occurs;
   (2) causing the charged stream to enter into a separation vessel through a gas or vapor space for minimizing charge dissipation from the charged phase mixture in the separation vessel back to where the free charge introduction took place, there being a sufficient excess of free charge introduced such that the volumetric charge distribution causes an electric field to be induced in the mixture in the vessel and the dispersed phase there to become charged, and the induced electric field and the charge on the dispersed phase interact to produce an electrical driving force acting on the dispersed phase so that said migration is due substantially to said driving force; and
   (3) allowing the migrating dispersed phase in said vessel to accumulate, within said phase mixture, adjacent to collector means for dispersed phase comprising at least one collector element of porous material having a surface region exposed to the migrating dispersed phase droplets, said porous material having sufficient porosity as to absorb dispersed liquid phase into its pores and thereby trap dispersed phase at separate sites on said surface region for promoting droplet coalescence and growth with further droplets undergoing electrically-driven migration to those sites.

19. Apparatus for use in the separation of a dispersed liquid phase from a continuous liquid phase, the phases together forming a phase mixture, by producing migration of dispersed phase within the phase mixture, said apparatus comprising:
   (1) means arranged to introduce free charge that is net unipolar into the phase mixture in such manner as to cause the continuous phase to act as a medium through which volumetric distribution of the introduced charge takes place;
   (2) a separator comprising:
      (i) a vessel into which, in use of said apparatus, phase mixture, charged by the free charge introducing means, is passed; and
      (ii) collector means for dispersed phase comprising at least one collector element of porous material disposed within said vessel with a surface region thereof exposed to migrating disposed phase droplets in said vessel;
   (3) flow control means operable for retaining a body of said charged phase mixture in the vessel and for discharging substantially dispersed-phase-free continuous liquid phase from the separator, continuously or periodically; and
   (4) a gas or vapour space which separates the phase mixture in the vessel from the free charge introducing means and through which the free charge introducing means is arranged to direct a stream of charged phase mixture before entering said vessel, for minimizing charge dissipation from the charged phase mixture in said vessel back to the free charge introducing means, said free charge introducing means being arranged to introduce a sufficient excess of free charge such that the volumetric charge distribution causes, in said body of charged phase mixture in said vessel, both an electric field to be induced in the phase mixture and the dispersed phase to become charged, and the induced electric field and the charge on the dispersed phase interact to produce an electrical driving force acting on the dispersed phase so that said migration is due substantially to said driving force, the dispersed phase migration causing dispersed phase to migrate to said collector element(s), leaving substantially dispersed-phase-free continuous liquid phase for discharge from said separator by said flow control means, said porous material having sufficient porosity as to absorb dispersed lilquid phase into its pores and thereby trap dispersed phase at separate sites on said surface region for promoting droplet coalescence and growth with further droplets undergoing electrically-driven migration to those sites.

20. Apparatus as claimed in claim 19, wherein the gas space is enclosed and means are provided for flowing a purge gas through said enclosed space.

21. Apparatus as claimed in claim 19, wherein said gas space is pressurized.

22. Apparatus as claimed in claim 19, wherein the free charge introducing means comprises a charge injector arranged to inject free charge, at least predominantly by field emission, into the phase mixture.

23. Apparatus as claimed in claim 19, wherein the collector means is in the form of a bed of densely packed porous beads of low electrical conductivity and means are provided for maintaining the level of the phase mixture in said vessel substantially constant and covering the bed of beads.

24. Apparatus as claimed in claim 19, wherein the absorptivity of the porous material is in the range of about 0.1 to about 40%.

25. Apparatus as claimed in claim 19, wherein the collector means comprises a porous membrane having one surface exposed to the migrating dispersed liquid phase and the other surface communicating with a closed reservoir for liquid which is the same as that forming said dispersed phase.

26. Apparatus as claimed in claim 25, wherein the collector means comprises an assembly of a pair of spaced-apart porous membranes in face-to-face array defining a closed reservoir between them for containing liquid which is the same as that forming said dispersed phase, the porous membrane assembly being arranged with both its outer membrane surfaces exposed to the charged phase mixture.

27. Apparatus as claimed in claim 25, for use in separating a dispersed liquid phase from a continuous liquid phase, wherein the membrane structure comprises a porous membrane assembly of two rectangular membranes, the assembly being rolled into a cylindrical configuration with spacer elements between adjacent turns to provide axial flow passages for the charged phase mixture, the cylindrical membrane structure being positioned coaxially within said vessel which is an upright cylindrical separation vessel, the free charge introducing means being positioned above the cylindrical membrane structure for issuing the charged mixture downwardly into the interior of the vessel through said gas or vapor space, the vessel also having means operable for the selective discharge of dispersed phase that has separated out under gravity.

28. Apparatus for use in separating a dispersed liquid phase from a continuous liquid phase, the phases together forming a liquid phase mixture and the density of the liquid forming the dispersed phase being larger than that of the continuous liquid phase, by producing migration of dispersed phase within the phase mixture, said apparatus comprising a charge injector including a pointed high potential electrode; means for flowing a stream of said phase mixture past said electrode at sufficient velocity that free charge that is net unipolar is injected by field emission into the liquid phase mixture and is conveyed by the flowing stream away from the high potential electrodes, the charge injector being arranged to inject the free charge into the phase mixture stream in such manner as to cause the continuous phase to act as a medium through which volumetric distribution of the injected charge occurs; a separator comprising a separation vessel into which the charge injector is arranged to pass the charged stream through a gas or vapor space between the charge injector and separation vessel, the gas or vapor space serving to minimise charge dissipation from the charged phase mixture in the separation vessel back to the charge injector, the charge injector being arranged to inject a sufficient excess of free charge into the phase mixture such that the volumetric charge distribution causes an electric field to be induced in the phase mixture in the vessel and the dispersed phase there to be charged, and the induced electric field and the charge on the dispersed phase interact to produce an electrical driving force acting on the dispersed phase so that said migration is due substantially to said driving force; and flow control means operable for retaining a body of said charged phase mixture in the vessel and for discharging substantially dispersed-phase-free continuous liquid phase from the separator, continuously or periodically; said separator further comprising collector means for dispersed phase comprising at least one collector element of porous material disposed within said vessel with a surface region thereof exposed to the migrating disposed phase droplets, said porous material having sufficient porosity as to absorb dispersed liquid phase into its pores and thereby trap dispersed phase at separate sites on said surface region for promoting droplet coalescence and growth with further droplets undergoing electrically-driven migration to those sites, thereby leaving a quantity of substantially dispersed-phase-free continuous liquid phase for discharge from said separator by said flow control means.

* * * * *